(12) United States Patent
Virolainen

(10) Patent No.: US 8,947,400 B2
(45) Date of Patent: Feb. 3, 2015

(54) APPARATUS, METHODS AND COMPUTER READABLE STORAGE MEDIUMS FOR PROVIDING A USER INTERFACE

(75) Inventor: Antti Virolainen, Espoo (FI)

(73) Assignee: Nokia Corporation, Espoo (FI)

( * ) Notice: Subject to any disclaimer, the term of this patent is extended or adjusted under 35 U.S.C. 154(b) by 1000 days.

(21) Appl. No.: 12/456,178

(22) Filed: Jun. 11, 2009

(65) Prior Publication Data

US 2010/0315327 A1    Dec. 16, 2010

(51) Int. Cl.
| | | |
|---|---|---|
| G06F 3/042 | (2006.01) | |
| G03B 21/10 | (2006.01) | |
| G06F 1/16 | (2006.01) | |
| G06F 3/14 | (2006.01) | |
| G09G 3/00 | (2006.01) | |

(52) U.S. Cl.
CPC .............. *G03B 21/10* (2013.01); *G06F 1/1626* (2013.01); *G06F 1/1632* (2013.01); *G06F 1/1639* (2013.01); *G06F 1/1643* (2013.01); *G06F 3/0425* (2013.01); *G06F 3/1423* (2013.01); *G06F 2203/04109* (2013.01); *G09G 3/001* (2013.01)
USPC ............. 345/175; 178/18.09; 353/19; 353/79

(58) Field of Classification Search
CPC ... G06F 1/1626; G06F 1/1632; G06F 1/1639; G06F 3/0425; G06F 2203/041
USPC .................... 178/18.01–19.07; 345/173–178; 353/19, 79
See application file for complete search history.

(56) References Cited

U.S. PATENT DOCUMENTS

| | | | |
|---|---|---|---|
| 5,964,847 A | 10/1999 | Booth, III et al. ................ 710/1 |
| 6,626,686 B1 | 9/2003 | D'Souza et al. ............. 439/131 |
| 7,372,456 B2 * | 5/2008 | McLintock ................... 345/173 |
| 2006/0010400 A1 | 1/2006 | Dehlin et al. ................ 715/856 |
| 2007/0046625 A1 | 3/2007 | Yee ................................ 345/156 |
| 2007/0126988 A1 * | 6/2007 | Gohman ......................... 353/30 |
| 2007/0159453 A1 | 7/2007 | Inoue ............................ 345/156 |
| 2008/0029691 A1 | 2/2008 | Han .............................. 250/224 |
| 2008/0278894 A1 | 11/2008 | Chen et al. .................... 361/681 |
| 2009/0219253 A1 * | 9/2009 | Izadi et al. .................... 345/173 |
| 2010/0001083 A1 | 1/2010 | Lapstun et al. .............. 235/494 |

FOREIGN PATENT DOCUMENTS

| | | |
|---|---|---|
| EP | 1 215 621 A2 | 12/2002 |
| GB | 2 360 664 A | 9/2001 |
| WO | WO 2007/060666 A1 | 5/2007 |
| WO | WO 2008/017077 | 2/2008 |

* cited by examiner

*Primary Examiner* — Michael Pervan
(74) *Attorney, Agent, or Firm* — Harrington & Smith

(57) ABSTRACT

Apparatus including a support configured to support a portable device; and a display coupled to the support and configured to receive and display a projected image, the projected image being generated by the portable device.

22 Claims, 5 Drawing Sheets

APPARATUS, METHODS AND COMPUTER READABLE STORAGE MEDIUMS FOR PROVIDING A USER INTERFACE

FIELD OF THE INVENTION

Embodiments of the present invention relate to apparatus, methods and computer readable storage mediums for providing a user interface. In particular, they relate to apparatus, methods and computer readable storage mediums for providing a user interface for a mobile cellular telephone.

BACKGROUND TO THE INVENTION

Portable devices, such as mobile cellular telephones, usually include a display for displaying a graphical user interface to a user. Additionally, portable devices usually include a user input device for enabling the user to control the portable device via the displayed graphical user interface.

However, the display of such portable devices is usually relatively small (usually due to the small size of the portable device) and a user may find the display uncomfortable to use for extended periods of time. Additionally, the user input device of the portable device may be relatively small and consequently difficult to operate.

BRIEF DESCRIPTION OF VARIOUS EMBODIMENTS OF THE INVENTION

According to various, but not necessarily all, embodiments of the invention there is provided apparatus comprising: a support configured to support a portable device; and a display coupled to the support and configured to receive and display a projected image, the projected image being generated by the portable device.

The display may be configured to receive the projected image from a projector of the portable device. The support may be configured to position the portable device at one or more predetermined positions relative to the display.

The apparatus may further comprise a projector configured to receive an image from the portable device and to project the image to the display.

The apparatus may further comprise a user input device configured to provide a signal, indicative of one or more user inputs, to the portable device to control the portable device. The user input device may be a touch screen portion of the display and the signal may be indicative of one or more user inputs to the graphical user interface displayed on the display. The user input device may include a substrate of the display and an electromagnetic radiation source configured to provide electromagnetic radiation to the substrate. The electromagnetic radiation may be substantially totally internally reflected within the substrate and wherein the signal provided to the portable device may comprise electromagnetic radiation scattered from one or more portions of the display contacted by the user.

The projected image displayed on the display may provide a graphical user interface.

The support may further comprise charging circuitry configured to provide electrical energy to the portable device.

The apparatus may further comprise an audio output device configured to receive audio data from the portable device and provide sound waves using the audio data.

The apparatus may further comprise one or more hinges for coupling the display and the support.

According to various, but not necessarily all, embodiments of the invention there is provided a user interface accessory for a portable device comprising an apparatus as described in any of preceding paragraphs.

According to various, but not necessarily all, embodiments of the invention there is provided a method comprising: providing a support configured to support a portable device; and coupling a display to the support, the display being configured to receive and display a projected image, the projected image being generated by the portable device.

The display may be configured to receive the projected image from a projector of the portable device.

The support may be configured to position the portable device at one or more predetermined positions relative to the display.

The method may further comprise providing a projector configured to receive an image from the portable device and to project the image to the display.

The method may further comprise providing a user input device configured to provide a signal, indicative of one or more user inputs, to the portable device to control the portable device. The user input device may be a touch screen portion of the display and the signal may be indicative of one or more user inputs to the display. The user input device may include a substrate of the display and an electromagnetic radiation source configured to provide electromagnetic radiation to the substrate, the electromagnetic radiation may be substantially totally internally reflected within the substrate and wherein the signal provided to the portable device may comprise electromagnetic radiation scattered from one or more portions of the display contacted by the user.

The projected image displayed on the display may provide a graphical user interface.

The support may further comprise charging circuitry configured to provide electrical energy to the portable device.

The method may further comprise providing an audio output device configured to receive audio data from the portable device and provide sound waves using the audio data.

The method may further comprise providing one or more hinges for coupling the display and the support.

According to various, but not necessarily all, embodiments of the invention, there is provided a computer readable storage medium encoded with instructions that, when executed by a processor, perform: receiving an image from a portable device at an apparatus comprising a support configured to support the portable device, a display coupled to the support and configured to receive and display a projected image, and a projector configured to receive an image from the portable device and to project the image to the display; and projecting the received image from the projector to the display.

The computer readable storage medium may be encoded with instructions that, when executed by a processor, perform: providing electrical energy to the portable device via charging circuitry of the support.

The computer readable storage medium may be encoded with instructions that, when executed by a processor, perform: receiving audio data from the portable device and controlling an audio output device to provide sound waves using the audio data.

According to various, but not necessarily all, embodiments of the invention, there is provided a portable device configured to use the apparatus as described above or the user interface accessory as described above.

BRIEF DESCRIPTION OF THE DRAWINGS

For a better understanding of various examples of embodiments of the present invention reference will now be made by way of example only to the accompanying drawings in which.

DETAILED DESCRIPTION OF VARIOUS EMBODIMENTS OF THE INVENTION

Figure 1:
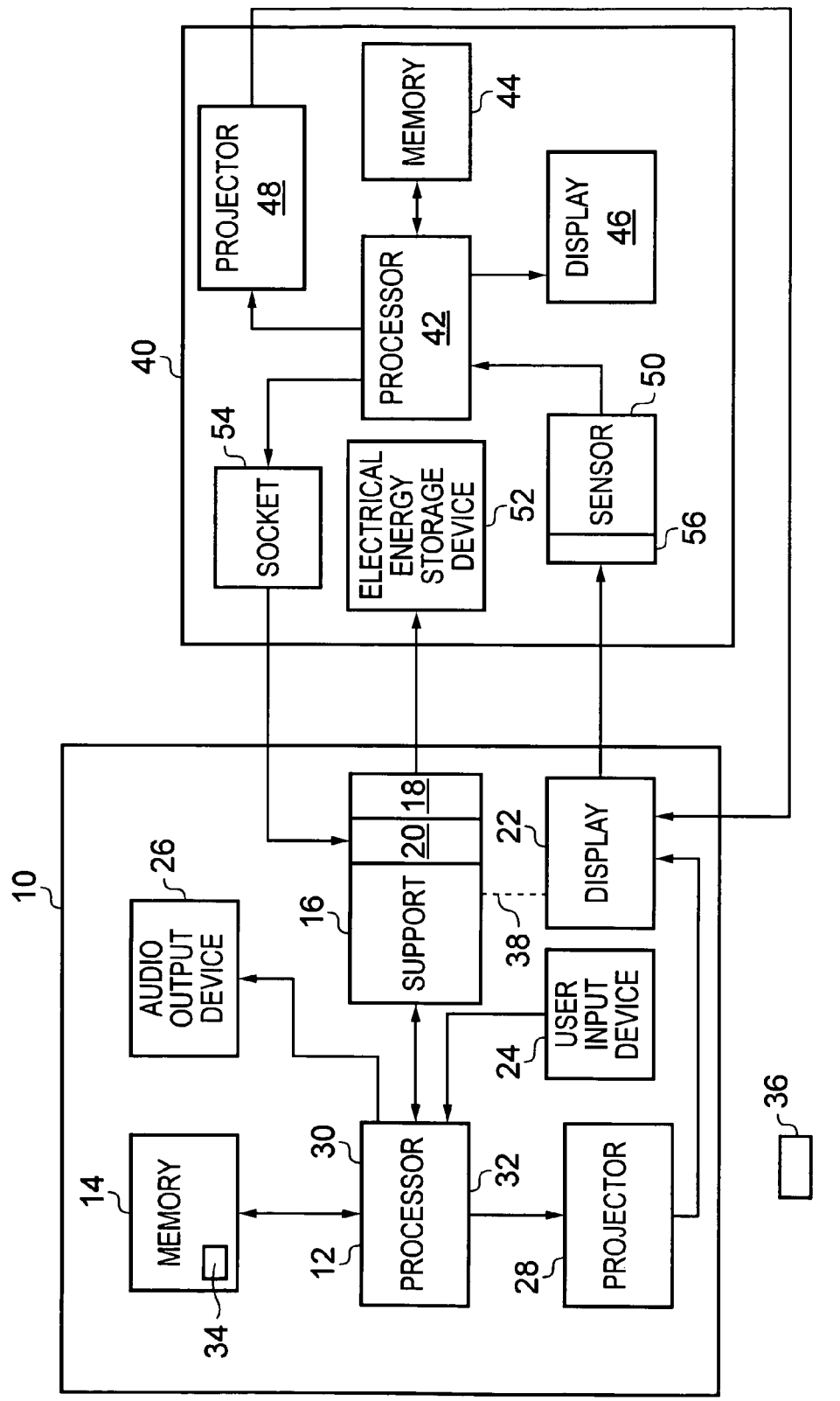
FIG. 1 illustrates a schematic diagram of an apparatus and a portable device according to various embodiments of the invention.
Figure 3:
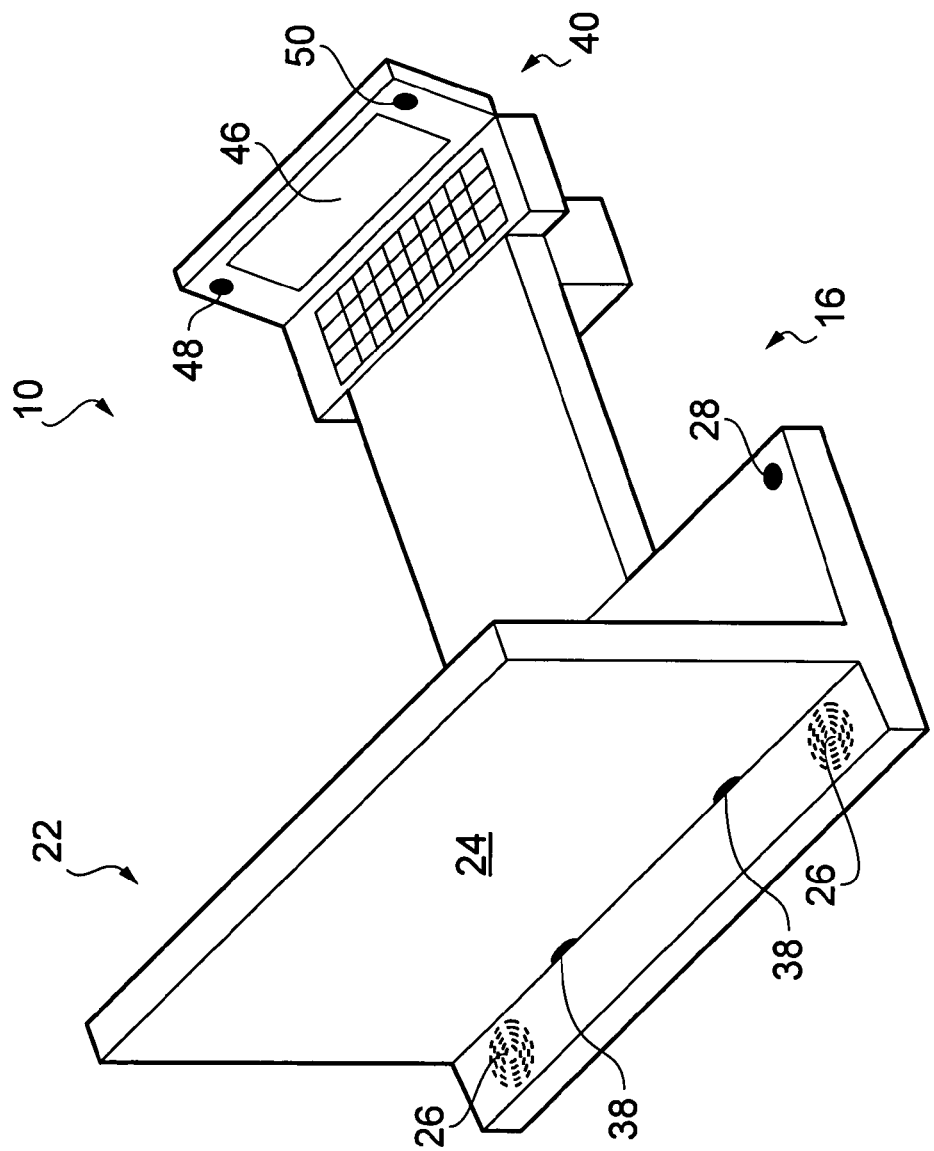
FIG. 3 illustrates a perspective view of an apparatus and a portable device according to various embodiments of the invention.

FIGS. 1 and 3 illustrate apparatus 10 comprising: a support 16 configured to support a portable device 40; and a display 22 coupled to the support 16 and configured to receive and display a projected image, the projected image being generated by the portable device 40.

In the following description, the wording 'connect' and 'couple' and their derivatives mean operationally connected/coupled. It should be appreciated that any number or combination of intervening components can exist (including no intervening components).

In more detail, FIG. 1 illustrates a schematic diagram of an apparatus 10 according to various embodiments of the invention. The apparatus 10 may include a processor 12, a memory 14, a support 16, a display 22, a user input device 24, an audio output device 26 and a projector 28. The apparatus 10 may be a user interface device/accessory for a portable device such as a mobile cellular telephone.

The processor 12 may be any suitable processor and may be, for example, a microprocessor. The implementation of the processor 12 can be in hardware alone (for example, a circuit), have certain aspects in software including firmware alone or can be a combination of hardware and software (including firmware).

The processor 12 may be implemented using instructions that enable hardware functionality, for example, by using executable computer program instructions in a general-purpose or special-purpose processor that may be stored on a computer readable storage medium (for example, a disk or a memory) to be executed by such a processor.

The processor 12 is configured to read from and write to the memory 14. The processor 12 may also comprise an output interface 30 via which data and/or commands are output by the processor 12 and an input interface 32 via which data and/or commands are input to the processor 12.

The memory 14 may be any suitable memory and may, for example be permanent built-in memory such as flash memory or it may be a removable memory such as a hard disk, secure digital (SD) card or a micro-drive. The memory 14 stores a computer program 34 comprising computer program instructions that control the operation of the apparatus 10 when loaded into the processor 12. The computer program instructions 34 provide the logic and routines that enables the apparatus to perform the methods illustrated in FIG. 4 and described below. The processor 12 by reading the memory 14 is able to load and execute the computer program 34.

The computer program instructions 34 provide: computer readable program means for receiving an image from a portable device 40 at the apparatus 10; and computer readable program means for projecting the received image from the projector 28 to the display 22.

The computer program may arrive at the apparatus 10 via any suitable delivery mechanism 36. The delivery mechanism 36 may be, for example, a computer-readable storage medium, a computer program product, a memory device, a record medium such as a Blue-ray disk, a CD-ROM or a DVD, an article of manufacture that tangibly embodies the computer program 34. The delivery mechanism 36 may be a signal configured to reliably transfer the computer program 34. The apparatus 10 may propagate or transmit the computer program 34 as a computer data signal.

Although the memory 14 is illustrated as a single component it may be implemented as one or more separate components some or all of which may be integrated/removable and/or may provide permanent/semi-permanent/dynamic/cached storage.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

The support 16 is configured to support a portable device such as a mobile cellular telephone and may have any suitable shape. The support 16 may comprise a body on which a portable device may be placed. The body of the support 16 may form a cradle that is shaped and dimensioned for receiving and supporting a portable device. The support 16 may comprise one or more connectors (one or more electrical and/or mechanical connectors for example) for connecting to the portable device and for supporting the portable device. Consequently, the apparatus 10 comprising the support 16 may be viewed as a docking station for a portable device.

The support 16 may house the processor 12 and the memory 14. The support 16 may also include charging circuitry 18 that is configured to provide electrical energy to a portable device. The charging circuitry 18 may include a charging connector that is connectable to a corresponding socket on a portable device and that may at least partially support the portable device.

The support 16 may also comprise a connector 20 that is configured to be received in a corresponding socket of a portable device and that may at least partially support the portable device. The connector 20 is configured to receive data from a portable device and provide the received data to the processor 12 for processing.

The display 22 may be any suitable display for receiving and displaying a projected image. The display 22 comprises a projection surface (comprising acrylic for example) that is able to receive electromagnetic waves (for example, visible light—400 nm to 700 nm) that form an image, from a projector, and then provide the electromagnetic waves to a user. The display 22 may have dimensions that enable a user to relatively easily view the content of the projected image. For example, the width of the display 22 may be more than twenty centimeters and the height of the display 22 may be more than eleven centimeters.

The display 22 and the support 16 are coupled to one another via a coupling link 38. The coupling link 38 may include one or more hinges that enable the display 22 and the support 16 to be folded to form a compact body that may be easily stored. In other embodiments, the coupling link 38 may be a fixed connection that does not enable the display 22 and the support 16 to be folded.

The user input device 24 may be any suitable user input device that is configured to provide a signal that is indicative of one or more user inputs to the user input device 24. The user input device 24 may be integrated into the support 16 or may be a separate device that is connectable to the support 16. The user input device 24 may be, for example, a joystick, a pointing stick, a keypad, a track ball, a touch pad, or a touch screen portion of the display 22. As described below with reference to FIG. 2, the user input device 24 may be a touch screen portion of the display 22 that uses a frustrated total internal reflection (FTIR) method.

The audio output device 26 is configured to receive an audio signal from the processor 12 and use the audio signal to provide sound waves to a user of the apparatus 10. The audio output device 26 may be any suitable device for generating sound waves and may include one or more loudspeakers for example. The audio output device 26 may integrated within the support 16 or may be a separate device that is connectable to the support.

The projector 28 is configured to receive an image (image data) from the processor 28 and project the image as electromagnetic radiation (for example, visible light having wavelengths between 400 and 700 nm) to the display 22. The projector 28 may include any suitable source for providing electromagnetic radiation and may include light emitting diodes (LED). The projector 28 may be integrated within the support 16 or may be a separate device that is connectable to the support 16.

FIG. 1 also illustrates a schematic diagram of a portable device 40 including a processor 42, a memory 44, a display 46, a projector 48, a sensor 50, an electrical energy storage device 52 and a socket 54. The portable device 40 may be, for example, a mobile cellular telephone, a personal digital assistant, a lap top computer or a palm top computer.

The processor 42 and the memory 44 are similar to the processor 12 and the memory 14 described above and will consequently not be described in detail. However, it should be appreciated that the memory 44 may include computer program instructions that when executed by the processor 12, enable the portable device 40 to function as described in the following paragraphs.

The display 46 is configured to receive an image (image data) from the processor 42 and display the image to a user of the portable device 40. The display 42 may be, for example, a liquid crystal display (LCD), a light emitting diode (LED) display or an organic light emitting diode (OLED) display. The dimensions of the display 42 may be relatively small due to the relatively small size of the portable device 40. For example, the display 42 may have a width of ten centimeters and a height of six centimeters.

The projector 48 is configured to receive an image (image data) from the processor 48 and project the image as electromagnetic radiation (for example, visible light having wavelengths between 400 and 700 nm). The projector 48 may receive substantially the same image from the processor 42 as the image received by the display 46. The projector 48 may include any suitable source for providing electromagnetic radiation and may include light emitting diodes (LED).

The sensor 50 is configured to receive and detect incident electromagnetic radiation and then provide a signal to the processor 42 for processing. The sensor 50 may be, for example, a charge coupled device (CCD) camera or a complementary metal-oxide semiconductor (CMOS) camera. The sensor 50 may include a band pass filter 56 that is substantially transparent to electromagnetic radiation having a wavelength within a particular band (for example, infra-red 750 nm to 100 μm) and that is substantially opaque to electromagnetic radiation having a wavelength outside of that particular band.

The electrical energy storage device 52 is configured to store electrical energy and provide electrical energy to the components of the portable device 40 (for the example, the display 46 and the sensor 50) to enable them to function. The electrical energy storage device 52 may include a socket that is connectable to a mains electricity supply for charging the electrical energy storage device 52. The electrical energy storage device 52 may be, for example, one or more electrochemical cells.

The socket 54 is configured to receive data from the processor 42 and provide the data to a connector inserted within the socket 54. For example, the socket 54 may receive the connector 20 of the support 16 and provide data from the processor 42 to the processor 12 of the apparatus 10.

The operation of the apparatus 10 according to various embodiments is described in the following paragraphs with reference to FIGS. 1 and 2. In these embodiments, the user input device 24 is a touch screen portion of the display 22 that uses a frustrated total internal reflection (FTIR) method.

Initially, a user places the portable device 40 on the support 16 and the charging circuitry 18 of the apparatus 10 connects to the electrical energy storage device 52. Additionally, the connector 20 of the apparatus 10 connects with the socket 54. The charging circuitry 18 of the support 16 provides electrical energy to the electrical energy storage device 52 and thereby charges the electrical energy storage device 52.

The processor 42 of the portable device 40 may then generate an image (for example, by reading data stored in the memory 14) and provide the image to the display 46 and to the projector 48 for display to a user. The projector 48 projects the image to the display 22 of the apparatus 10 and the user is consequently able to view the image on the display 22.

It should be appreciated that the support 16 may be configured so that the projected image displayed on the display 22 is focused and occupies a substantial portion of the display 22. In order to achieve this, the support 16 may support the portable device 40 at one or more predetermined positions relative to the display 22. The one or more predetermined positions are spaced from the display 22 at distances and orientations that result in the projected image being displayed clearly to the user. Additionally, the support 16 may include one or more optical components (lenses or mirrors for example) that assist in providing the projected image to the display 22.

The image provided to the projector 48 and consequently to the display 22 may include a graphical user interface (GUI) for enabling the user to control the operation of the portable device 40. The graphical user interface may include one or more user selectable objects that, when selected, change the operation of the portable device 40 or change the content of the projected image (for example, the graphical user interface may change to show different user selectable objects).

Figure 2:
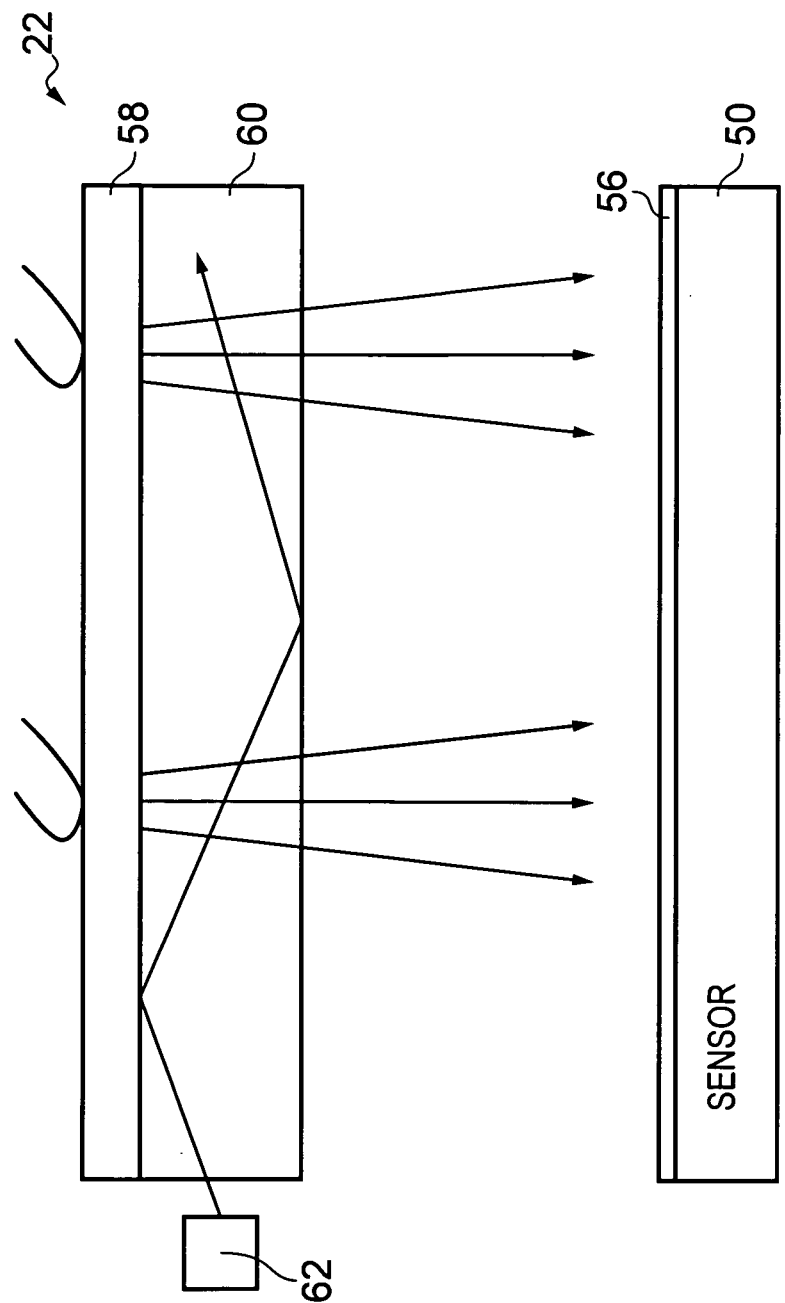
FIG. 2 illustrates a cross sectional view of a display of an apparatus according to various embodiments of the invention.

With reference to FIG. 2, the display 22 includes a projection surface 58 for displaying the projected image, a light transmissive substrate 60 (Plexiglass, acrylic or polycarbonate for example) and an electromagnetic radiation source 62. The projection surface 58 and the light transmissive substrate 60 form a laminate structure and a flexible substrate (silicon rubber for example) may be provided between the projection surface 58 and the light transmissive substrate 60.

The electromagnetic radiation source 62 is positioned adjacent the light transmissive substrate 60 and is configured to provide electromagnetic radiation (infra-red radiation 750 nm to 100 μm for example) to the light transmissive substrate 60. The electromagnetic radiation source 62 and the substrate 60 are oriented relative to one another so that the electromagnetic radiation provided by the source 62 is substantially subject to total internal reflection within the substrate 60. The electromagnetic radiation source 62 may include, for example, a plurality of light emitting diodes that emit infra-red radiation.

When the user contacts the display 22 to provide one or more inputs to the graphical user interface displayed on the projection surface 58, the electromagnetic radiation 60 within the substrate 60 is frustrated and is scattered towards the sensor 50 of the portable device 40. The scattered electromagnetic radiation forms one or more signals that are indicative of one or more user inputs to the graphical user interface displayed on the display 22.

The scattered electromagnetic radiation is received at the band pass filter 56 of the sensor 50. The band pass filter 56 is substantially transparent to the scattered electromagnetic radiation and substantially opaque to other (background) electromagnetic radiation (visible light for example). For example, the band pass filter 56 may be a 'narrow' band pass filter having a bandwidth of 10 nm to 30 nm and a centre wavelength that is substantially the same as the wavelength of the electromagnetic radiation provided by the electromagnetic radiation source 62.

The sensor 50 receives the filtered output from the band pass filter 56 and detects the one or more user inputs to the graphical user interface. The sensor 50 then provides a signal (indicative of the one or more user inputs) to the processor 42.

The processor 42 may then further filter the output from the sensor 50 to more accurately define the one or more user inputs. Subsequently, the processor 42 may assign an ID number and X, Y co-ordinates to the one or more user inputs. The processor may then map the identified user inputs onto graphical user interface framework to determine which user selectable object or portion of the graphical user interface was selected and then control the operation of the portable device 40 accordingly. For example, the processor 42 may determine that the user has selected an internet browser. The processor 42 may then connect to the internet and control the display 46 and the projector 48 to provide the graphical user interface for the internet browser.

The processor 42 of the portable device 10 may also provide audio data to the processor 12 of the apparatus 10. The processor 12 may then use the audio data to control the audio output device 26 to provide sound waves to the user. The sound waves provided by the audio output device 26 may accompany the projected image displayed on the display 22. For example, where the display 22 is displaying a movie, the sound waves provided by the audio output device 26 may be the audio for the movie (the sound track, speech, special sound effects for example).

FIG. 3 illustrates a perspective view of an apparatus 10 and a portable device 40 according to various embodiments of the invention. In these embodiments, the support 16 includes a first part that is coupled to the display 22 via two hinges 38 and a second part that is configured to support the portable device 40. The display 22 is a rear projection screen and may be folded relative to the support 16 to provide a flat, compact device that may be easily transported and stored. It should be appreciated that FIG. 3 is provided to assist understanding of embodiments of the invention and that the apparatus 10 and the portable device 40 may have other shapes and configurations to the one illustrated.

In various embodiments of the invention, the portable device 40 may not include a projector 48. In these embodiments, the processor 42 provides an image to the processor 12 of the apparatus 10 via the socket 54 and the connector 20. The operation of the apparatus 10 is described in the following paragraphs with reference to the flow diagram illustrated in FIG. 4.

At block 64, the processor 12 receives the image from the portable device 40 via the socket 54 and the connector 20. At block 66, the processor 12 controls the projector 28 to project the received image to the display 22. At block 68, the processor 12 receives audio data from the portable device 40 and controls the audio output device 26 to provide sound waves. At block 70, the processor 12 controls the charging circuitry 18 to provide electrical energy to the electrical energy storage device 52 of the portable device 40.

It should be appreciated that block 68 may be carried out in parallel with blocks 64, 66 and that block 70 may be carried out continuously in parallel with blocks 64, 66 and 68.

Figure 5:
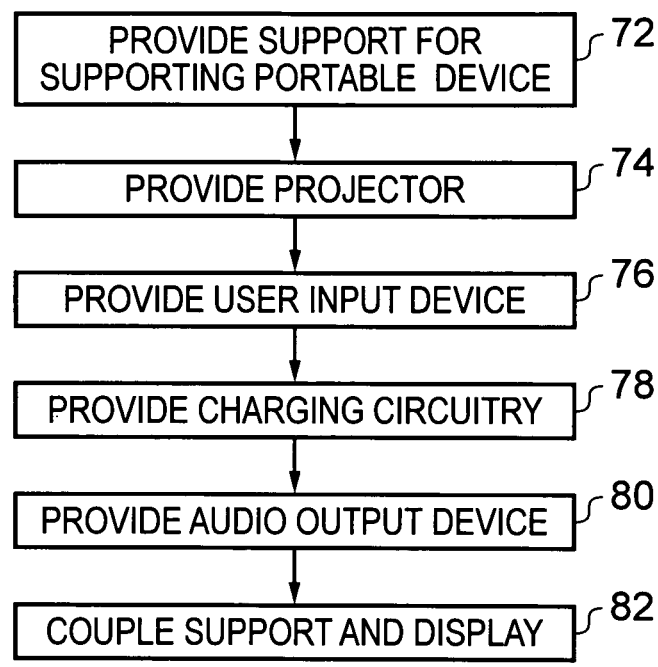
FIG. 5 illustrates a flow diagram of another method according to various embodiments of the invention.

FIG. 5 illustrates a flow diagram of a method of manufacturing an apparatus 10 according to various embodiments of the present invention. At block 72, the method includes providing a support 16 for supporting a portable device 40.

At block 74, the method includes providing a projector 28. The projector 28 may be provided as an integral part of the support 16 or as a connectable peripheral device.

At block 76, the method includes providing a user input device 24. The user input device 24 may be provided as an integral part of the support 16 or as a connectable peripheral device. Alternatively, the user input device 24 may be provided as a touch screen portion of a display 22.

At block 78, the method includes providing charging circuitry 18. The charging circuitry 18 may be provided as an integral part of the support 16.

At block 80, the method includes providing an audio output device 26. The audio output device 26 may be provided as an integral part of the support 16 or as a connectable peripheral device.

At block 82, the support 16 and a display 22 are coupled to one another. In various embodiments, one or more hinges may be used to couple the support 16 and the display 22. In other embodiments, the support 16 and the display 22 may be coupled to one another via a fixed link that prevents relative movement between the support 16 and the display 22.

Embodiments of the present invention may provide several advantages. One such advantage is that the display 22 of the apparatus 10 may be larger than the display 46 of the portable device 40. Consequently, a user may find the display 22 more comfortable to view than the display 46. Additionally, the user may be able to view the display 22 from a greater distance due to the greater size of the displayed image on the display 22.

In the above described embodiment where the user input device 24 is incorporated into the display 22 as a touch screen portion, the apparatus 10 may provide a relatively simple user interface that may enable a wide variety of users to operate the portable device 40. For example, children may find a touch screen display 22 simpler to operate than a plurality of buttons provided on the portable device 40.

Additionally, the user may be able to use the combination of the apparatus 10 and the portable device 40 for relatively long periods of time since the apparatus 10 includes charging circuitry for charging the portable device 40. This may be particularly advantageous when the combination of the apparatus 10 and the portable device 40 are being used for activities that occupy large periods of time (watching a movie for example).

Furthermore, where the user input device 24 is a touch screen portion of the display 22 that operates using a frustrated total internal reflection (FTIR) method, embodiments of the invention may enable a user to provide simultaneous multiple inputs to control the portable device 40.

Another advantage is that the combination of the apparatus 10 and the portable device 40 may be used instead of a desktop personal computer since the combination of the apparatus 10 and the portable device 40 effectively provides a multi-media computer. The removal of a desktop personal computer from a user's home may provide the user with more living space and enable the user to maintain a single computer (the portable device 40) for all the user's requirements.

Figure 4:
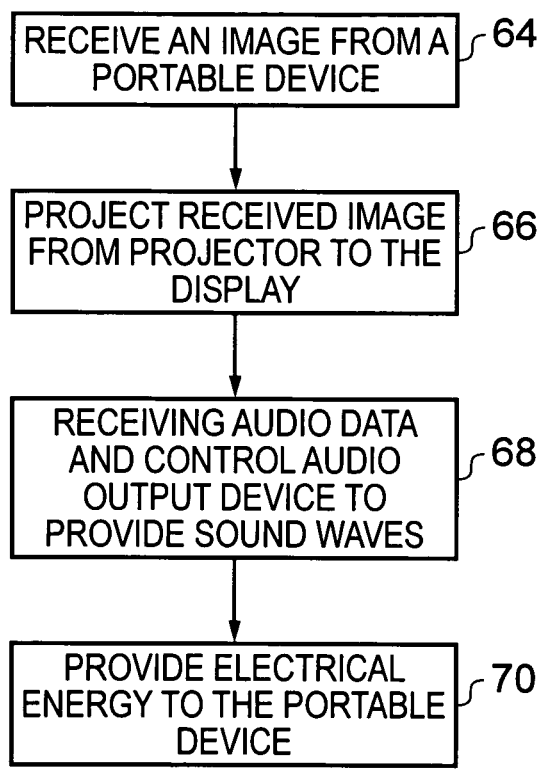
FIG. 4 illustrates a flow diagram of a method according to various embodiments of the invention.

The blocks illustrated in the FIGS. 4 and 5 may represent steps in a method and/or sections of code in the computer program 34. The illustration of a particular order to the blocks does not necessarily imply that there is a required or preferred order for the blocks and the order and arrangement of the block may be varied. Furthermore, it may be possible for some steps to be omitted.

Although embodiments of the present invention have been described in the preceding paragraphs with reference to various examples, it should be appreciated that modifications to the examples given can be made without departing from the scope of the invention as claimed. For example, it should be appreciated that the processor 12, the memory 14, the charging control circuitry 18, the connector 20, the user input device 24, the audio output device 26 and the projector 28 are optional features of the apparatus 10. Consequently, in various embodiments the apparatus 10 may not include one or more of these components.

Furthermore, the apparatus 10 may include the sensor 50 instead of (or in addition to) the portable device 40. For example, the sensor 50 may be incorporated into the support 16 of the apparatus 10. Alternatively, the sensor 50 may be separate from and connectable to the apparatus 10 and to the portable device 40. The processor 12 of the apparatus 10 may process the output from the sensor 50 (as described above) and then provide a control signal to the processor 42 of the portable device 40 to control a graphical user interface displayed on the display 46. This may provide an advantage in that since the output from the sensor 50 is processed by the processor 12 of the apparatus 10, the processor 42 of the portable device 40 may have increased processing capacity for other functions. In other embodiments, the output from the sensor 50 of the apparatus 10 may be processed by the processor 42 of the portable device 40 as described above.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. An apparatus comprising:
a support configured to support a portable device;
a display coupled to the support and configured to receive and display a projected image, the projected image being projected by the portable device,
wherein the support comprises one or more optical components configured to at least partially direct the projected image from the portable device to the display, the one or more optical components comprising one or more lenses; and
a user input device configured to provide a signal, indicative of one or more user inputs, to the portable device to control the portable device, wherein the user input device comprises:
a substrate of the display; and
an electromagnetic radiation source configured to provide electromagnetic radiation to the substrate, the electromagnetic radiation being substantially totally internally reflected within the substrate;
wherein the signal provided to the portable device comprises electromagnetic radiation scattered from one or more portions of the display contacted by the user.

2. The apparatus as claimed in claim 1, wherein the display is configured to receive the projected image from a projector of the portable device.

3. The apparatus as claimed in claim 1, wherein the support is configured to position the portable device at one or more predetermined positions relative to the display.

4. The apparatus as claimed in claim 1, further comprising a projector configured to receive an image from the portable device and to project the image to the display.

5. The apparatus as claimed in claim 1, wherein the projected image displayed on the display provides a graphical user interface; and wherein the user input device is a touch screen portion of the display and the signal is indicative of one or more user inputs to the graphical user interface displayed on the display.

6. The apparatus as claimed in claim 1, wherein the support further comprises charging circuitry configured to provide electrical energy to the portable device.

7. The apparatus as claimed in claim 1, further comprising an audio output device configured to receive audio data from the portable device and provide sound waves using the audio data.

8. The apparatus as claimed in claim 1, further comprising one or more hinges for coupling the display and the support.

9. A user interface accessory for a portable device comprising an apparatus as claimed in claim 1.

10. A method comprising:
providing a support configured to support a portable device;
coupling a display to the support, the display being configured to receive and display a projected image, the projected image being projected by the portable device;
wherein the support comprises one or more optical components configured to at least partially direct the projected image from the portable device to the display, the one or more optical components comprising one or more lenses; and
providing a user input device configured to provide a signal, indicative of one or more user inputs, to the portable device to control the portable device, wherein the user input device comprises a substrate of the display and an electromagnetic radiation source configured to provide electromagnetic radiation to the substrate, the electromagnetic radiation being substantially totally internally reflected within the substrate and wherein the signal provided to the portable device comprises electromagnetic radiation scattered from one or more portions of the display contacted by the user.

11. The method as claimed in claim 10, wherein the display is configured to receive the projected image from a projector of the portable device.

12. The method as claimed in claim 10, wherein the support is configured to position the portable device at one or more predetermined positions relative to the display.

13. The method as claimed in claim 10, further comprising providing a projector configured to receive an image from the portable device and to project the image to the display.

14. The method as claimed in claim 10, wherein the projected image displayed on the display provides a graphical user interface and wherein the user input device is a touch screen portion of the display and the signal is indicative of one or more user inputs to the display.

15. The method as claimed in claim 10, wherein the support further comprises charging circuitry configured to provide electrical energy to the portable device.

16. The method as claimed in claim 10, further comprising providing an audio output device configured to receive audio data from the portable device and provide sound waves using the audio data.

17. The method as claimed in claim 10, further comprising providing one or more hinges for coupling the display and the support.

18. A non-transitory computer readable storage medium encoded with instructions that, when executed by a processor, perform:
    receiving an image from a portable device at an apparatus comprising:
    a support configured to support the portable device,
    a display coupled to the support and configured to receive and display a projected image, the projected image being projected by the portable device,
    a projector configured to receive an image from the portable device and to project the image to the display,
    wherein the support comprises one or more optical components configured to at least partially direct the projected image from the portable device to the display, the one or more optical components comprising one or more lenses, and
    a user input device configured to provide a signal, indicative of one or more user inputs, to the portable device to control the portable device, wherein the user input device comprises a substrate of the display and an electromagnetic radiation source configured to provide electromagnetic radiation to the substrate, the electromagnetic radiation being substantially totally internally reflected within the substrate and wherein the signal provided to the portable device comprises electromagnetic radiation scattered from one or more portions of the display contacted by the user; and
    projecting the received image from the projector to the display.

19. The non-transitory computer readable storage medium, as claimed in claim 18, encoded with instructions that, when executed by a processor, perform:
    providing electrical energy to the portable device via charging circuitry of the support.

20. The non-transitory computer readable storage medium as claimed in claim 18, encoded with instructions that, when executed by a processor, perform;
    receiving audio data from the portable device and controlling an audio output device to provide sound waves using the audio data.

21. A device comprising:
    a display configured to received image data comprising an image and configured to display the image;
    a projector configured to receive the image data comprising the image and configured to project the image onto a display coupled to a support apparatus, via one or more optical components of the support apparatus, the one or more optical components comprising one or more lenses, wherein the projector is configured to project an image having a graphical user interface; and
    a sensor configured to receive a signal indicative of one or more user inputs to the graphical user interface on a touch screen portion of the display coupled to the support apparatus, wherein the sensor is configured to received a signal having electromagnetic radiation scattered from one or more portions of the display contacted by a user;
    wherein the device is configured to be supported by the support apparatus.

22. The device as claimed in claim 21, further configured to provide audio data to the support apparatus and wherein the device is a portable device.

* * * * *